FIGURE I. INFRARED SPECTRUM OF UMBRINOMYCIN A

FIGURE 2. INFRARED SPECTRUM OF UMBRINOMYCIN B

FIGURE 3.
INFRARED SPECTRUM OF DIUMYCIN A

FIGURE 4.
INFRARED SPECTRUM OF POTASSIUM SALT OF DIUMYCIN A

FIGURE 6

INFRARED SPECTRUM OF POTASSIUM SALT OF DIUMYCIN B

EDWARD MEYERS
RICHARD DONOVICK
FRANK L. WEISENBORN
FELIX E. PANSY
*INVENTORS*

United States Patent Office 3,496,268
Patented Feb. 17, 1970

3,496,268
UMBRINOMYCIN AND DIUMYCIN
Edward Meyers, Highland Park, Richard Donovick, Green Brook, and Frank Lee Weisenborn and Felix Edward Pansy, Somerset, N.J., assignors to E. R. Squibb & Sons, Inc., New York, N.Y., a corporation of Delaware
Continuation-in-part of application Ser. No. 604,964, Dec. 27, 1966. This application Nov. 15, 1967, Ser. No. 693,038
Int. Cl. A61k 21/00; C07g 11/00
U.S. Cl. 424—118
6 Claims

ABSTRACT OF THE DISCLOSURE

This invention relates to the new antibiotics, umbrinomycin and diumycin, and their respective components, umbrinomycin A and umbrinomycin B and diumycin A and diumycin B. The antibiotics are co-produced by culturing the microorganism Streptomyces umbrinus. The umbrinomycin and diumycin are separated by selective solvent treatment and the components of each are isolated by chromatography or other methods known in the art. Umbrinomycin and diumycin both possess antibacterial activity against gram-positive bacteria, inter alia.

---

This application is a continuation-in-part of our application, Ser. No. 604,964, filed Dec. 27, 1966, which is a continuation-in-part of our application, Ser. No. 446,821, filed Apr. 9, 1965, both applications are now abandoned.

This invention relates to new antibiotic substances, to methods for their production by fermentation and to methods for their concentration, purification and isolation.

The novel antibiotic substances of this invention comprise two groups of substances. The mixture of antibiotics in one group is hereinafter designated generically as umbrinomycin and contains at least two specific antibiotics which will be called umbrinomycin A and umbrinomycin B. The mixture of antibiotics in the other group is hereafter designated generically as diumycin and contains at least two specific antibiotics which will be called diumycin A and diumycin B.

Umbrinomycin and diumycin are co-produced by the cultivation under controlled conditions of the microorganism Streptomycin umbrinus. The strain of Streptomyces umbrinus used was isolated from a soil sample obtained in North Carolina. This strain has been deposited with the American Type Culture Collection in Rockville, Maryland, where it was given accession number 15972 and is hereinafter referred to as Streptomyces umbrinus ATCC 15972.

THE MICROORGANISM

The Streptomyces umbrinus microorganism employed in the practice of this invention is isolated and characterized by first shaking a portion of the soil sample in sterile distilled water and plating it on an agar medium containing the following materials:

| | Grams |
|---|---|
| Agar | 15 |
| Sucrose | 10 |
| Galactose | 10 |
| Citric acid | 1.2 |
| $(NH_4)_2HPO_4$ | 0.4 |
| KCl | 0.08 |
| $MgCl_2.6H_2O$ | 0.418 |
| $MnCl_2.4H_2O$ | 0.036 |
| $FeCl_3.6H_2O$ | 0.023 |
| $ZnCl_3.6H_2O$ | 0.021 |
| $CoCl_2.6H_2O$ | 0.004 |
| Distilled water to 1000 ml. | |

The medium is adjusted to pH 7.0 and sterilized in an autoclave at 121° C. for thirty minutes. After seven to ten days incubation at 25° C., colonies of Streptomyces umbrinus are isolated from the plated soil. These isolated colonies are then grown in a medium containing:

| | Grams |
|---|---|
| Beef extract | 1.5 |
| Yeast extract | 3.0 |
| Peptone | 6.0 |
| Dextrose | 1.0 |
| Distilled water to 1000 ml. | |

The medium is autoclaved at 121° C. for fifteen minutes.

The organism is capable of utilizing the following carbon sources in a basal medium containing $(NH_4)_2SO_4$ as a source of nitrogen: glucose, mannitol, inositol, xylose, arabinose, fructose, rhamnose, raffinose, galactose, trehalose, melibiose, sucrose and lactose. Growth is not supported by sorbitol.

The organism grows well and sporulates on tomato paste-oatmeal agar, yeast-malt extract agar and synthetic salts-starch agar. Vegetative growth is rapid, producing a characteristic chocolate brown vegetative mycelium which undergoes fragmentation in about seven days.

Aerial mycelium is produced in about fourteen days and is assignable to the olive-buff spore color series of Pridham. The color matches chips 3ba to 3cb in the Color Harmony Manual. Sporophores are straight (RF morphology section) with no tendency toward flexuousness or spirals. The spores are smooth and cylindric to ovoid. Melanoid pigment is produced on organic media.

THE ANTIBIOTICS

Streptomyces umbrinus produces antibiotics which possess broad activity against gram-positive bacteria, e.g., Staphylococcus aureus, Bacillus polymyxa and Mycobacterium bovis, yeasts and fungi.

To form the antibiotics, Streptomyces umbrinus is grown at 25° C. under submerged aerobic conditions in an aqueous nutrient medium containing an assimilable carbohydrate and nitrogen source. The fermentation is carried out for approximately 168 hours, at the end of which time the antibiotics have been formed.

After the fermentation is completed, the broth is adjusted to a pH of about 3 and filtered after addition of filter aid. The antibiotics are extracted from the mycelium (i.e., filter cake) with methanol. The methanolic extract is adjusted to a pH of about 6 to 8 and concentrated in vacuo, leaving an aqueous suspension.

To recover only the umbrinomycin antibiotics, the aqueous suspension is adjusted to pH 7.0, and is then extracted with chloroform. The organic phase is then dried with anhydrous $Na_2SO_4$ and concentrated to a small volume. The concentrate is diluted with eight to ten volumes of acetone. The acetone soluble phase is concentrated to a small volume and diluted with ten volumes of n-hexane. The resulting precipitate is collected by centrifugation, washed with hexane and dried. Purification is effected by chromatography on silica gel followed by rechromatography on acid-washed alumina. The purified material so obtained is a mixture of two isomeric antibiotics, umbrinomycin A and umbrinomycin B, which are then resolved by gradient elution chromatography on acid-washed alumina.

To recover the diumycin antibiotics, the aqueous suspension, preferably at pH 8, is extracted with butanol. Umbrinomycin is extracted into the butanol, leaving the diumycin behind in the aqueous layer. The layers are separated, and the butanol layer containing the umbrinomycin is worked up separately. The aqueous layer containing the diumycin is adjusted to pH 3 with concentrated hydrochloric acid and extracted with water-saturated n-butanol. The butanol layer is back extracted with water at pH 7 and the aqueous extracts concentrated in vacuo to dryness. The residue is dissolved in methanol and the methanol insoluble material removed by filtration. The methanolic solution is diluted with acetone to yield a precipitate of the crude diumycin antibiotic which is dried and then further purified by a combination of Sephadex column chromatography, silica gel chromatography and countercurrent distribution; or, alternatively, by a combination of Sephadex chromatography, silica gel chromatography, and Avicel partition chromatography. Countercurrent-distribution or partition paper chromatography may be used to resolve the diumycin complex into diumyin A and B.

Umbrinomycin

Umbrinomycin is a mixture of at least two antibiotics, umbrinomycin A and umbrinomycin B. It, and all of its components, are antibiotics which possess broad activity against gram-positive bacteria, yeasts and fungi. Thus in a two-fold tube dilution assay done with umbrinomycin material of the purity of that obtained in Example 5 following, the minimum inhibiting concentration (M.I.C.) in micrograms per ml. was determined to be as follows:

| Microorganism: | M.I.C. ($\mu$g./ml.) |
|---|---|
| *Staphylococcus aureus* 209P | 0.08 |
| *Candida albicans* | 12.5 |
| *Trichophyton mentagrophytes* | 1.6 |
| *Fusarium bulbigenum* | 18.7 |
| *Mycobacterium bovis* B.C.G. | 0.3 |
| *Salmonella schottmuelleri* | >50 |
| *Pseudomonas aeruginosa* | >50 |
| *Proteus vulgaris* | >50 |

The individual components, umbrinomycin A and umbrinomycin B, possess the same qualitative antimicrobial spectrum.

Umbrinomycin, and each of its antibiotic components, can be used in research and hospital laboratories to isolate gram negative bacteria from soils or from swabs or body exudates in which mixed populations of gram positive and gram negative organisms are present. Furthermore, umbrinomycin, and each of its antibiotic components, can be used to disinfect laboratory equipment contaminated with *Staphylococcus aureus*, especially when the equipment may be subject to damage by the usual means of disinfection.

Umbrinomycin, umbrinomycin A and umbrinomycin B are alcohols that form esters with acids. These esters can be formed by interacting the umbrinomycin with an acyl halide or acid anhydride in the presence of a base, such as pyridine. Since the umbrinomycins contain three acylable hydroxyl groups they are capable of forming mono-, di- and tri-esters depending on the ratio of acylating agent to umbrinomycin present in the reaction medium. If an excess of acrylating agent is used a triester is formed.

Although any acrylating agent can be used, the preferred acrylating agents are the acid anhydrides and acyl chlorides of hydrocarbon carboxylic acids of less than twelve carbon atoms, such as the lower alkanoic acids (e.g., acetic and propionic acid), the lower alkenoic acids, the monocyclic aryl carboxylic acids (e.g., benzoic acid), the monocyclic aryl lower alkanoic acid (e.g., phenacetic acid), the cycloalkane carboxylic acids, and the cycloalkene carboxylic acids.

Crystalline umbrinomycin A has the following physical and chemical properties:

Color: Red.
Melting point: 126–129° C.
Elementary analysis (approximate):
  Percent—
    C=63.78
    H=6.19
    O=30.03 (by difference)
Empirical formula: $C_{22}H_{24}O_8$.
Solubility: Soluble in ether, methanol and benzene. Insoluble in hexane.
Ultraviolet spectrum: The ultraviolet absorption maxima of crystalline umbrinomycin A in ethanol are:

| $\lambda_{max.}$ (m$\mu$): | $\epsilon$ |
|---|---|
| 242.5 | 13,520 |
| 304 | 15,800 |
| 476 | 5,600 |

Infrared spectrum: The infrared spectrum of umbrinomycin A suspended in Nujol mull is reproduced in FIGURE 1 in the drawings.

Crystalline umbrinomycin B has the following physical and chemical properties:

Color: Maroon.
Melting point: 192—193.5° C.
Elementary analysis (approximate):
  Percent—
    C=63.53
    H=5.91
    O=30.56 (by difference).
Empirical formula: $C_{22}H_{24}O_8$.
Solubility: Same as umbrinomycin A.
Ultraviolet spectrum: The ultraviolet absorption maxima of crystalline umbrinomycin B in ethanol are:

| $\lambda$ max. (m$\mu$) | $\epsilon$ |
|---|---|
| 243 | 16,500 |
| 304 | 19,000 |
| 476 | 5,500 |

Infrared spectrum: The infrared spectrum of umbrinomycin B suspended in Nujol mull is reproduced in FIGURE 2 in the drawings.

Diumycin

Diumycin is a mixture of at least two antibiotics, diumycin A and diumycin B. It, and all of its components, are antibiotics which possess activity against gram-positive bacteria and acid-fast bacteria. Thus, in a two-fold tube dilution assay done with diumycin material of the purity of that obtained in Example 14 following, the minimum inhibiting concentration (M.I.C.) in micrograms per ml. was determined to be as follows:

| Microorganism: | M.I.C. ($\mu$g./ml.) |
|---|---|
| Staphylococcus aureus 209P | 0.06 |
| Streptococcus pyogenes C203 | <0.002 |
| Bacillus subtilis SC3777 | 0.14 |
| Klebsiella pneumoniae SC1565 | >25.0 |
| Sarcina lutea SC2495 | >25.0 |
| Escherichia coli SC2927 | >25.0 |
| Pseudomonas aeruginosa SC3840 | >25.0 |
| Candida albicans SC1539 | >25.0 |
| Salmonella schottmuelleri SC3850 | >25.0 |
| Mycobacterium tuberculosis BCG | 3.0 |

The individual components, diumycin A and diumycin B, possess the same qualitative antibacterial spectrum.

Diumycin, diumycin A and diumycin B are acids that form salts with bases. These salts can be formed by interacting with diumycin with a base, such as an inorganic base, e.g., ammonium hydroxide, an alkali metal hydroxide, such as sodium hydroxide and potassium hydroxide, and an alkaline earth metal hydroxide, such as calcium hydroxide, barium hydroxide and magnesium hydroxide, and an organic base, such as a primary, secondary and tertiary amines, e.g., a (lower alkyl)amine, such as methylamine, a di(lower alkyl)amine, such as diethylamine, a tri(lower alkyl)amine, such as triethylamine, a (hydroxy-lower alkyl)amine, such as ethanolamine, and so forth.

The diumycins are phosphorus containing antibiotics that yield no 6-deoxyglucosamine (Quinovosamine) on acid hydrolysis.

Diumycin A has the following physical and chemical properties:

Color: Colorless (white).
Melting point (acid): About 180° C. with decomposition.
Elementary analysis (free acid-hydrate) (approximate): C, 46.5%; H, 7.2%; N, 4.5%; P, 2.0%; O, 39.8% (by difference).
Specific optical rotation: $[\alpha]_D$ —8.7° (potassium salt in water).
Molecular weight: (An analytic ultrasonic centrifuge) 1800±10% in 10% (0.2 molar sodium chloride, 0.02 molar phosphate buffer, pH 6.5) —90% ethanol.
Solubility: Soluble in water, lower alkanols, pyridine and acetic acid. Sparingly soluble or insoluble in acetone, chloroform and benzene.
Ultraviolet spectrum: Diumycin A, as its potassium salt in water, has an ultraviolet absorption maximum at 257 m$\mu$ ($E_{1cm.}^{1\%}$, 118)

Infrared spectrum: The infrared spectrum of diumycin A as the free acid in KBr pellet is reproduced in FIGURE 3 in the drawings and as the potassium salt in KBr pellet is reproduced in FIGURE 4 in the drawings.
Neutral equivalent by potentiometric titration: 540.
Distribution coefficient in n-propanol, n-butanol, 0.5 N ammonia (2:3:4 by volume): 0.19.

Figure 5:
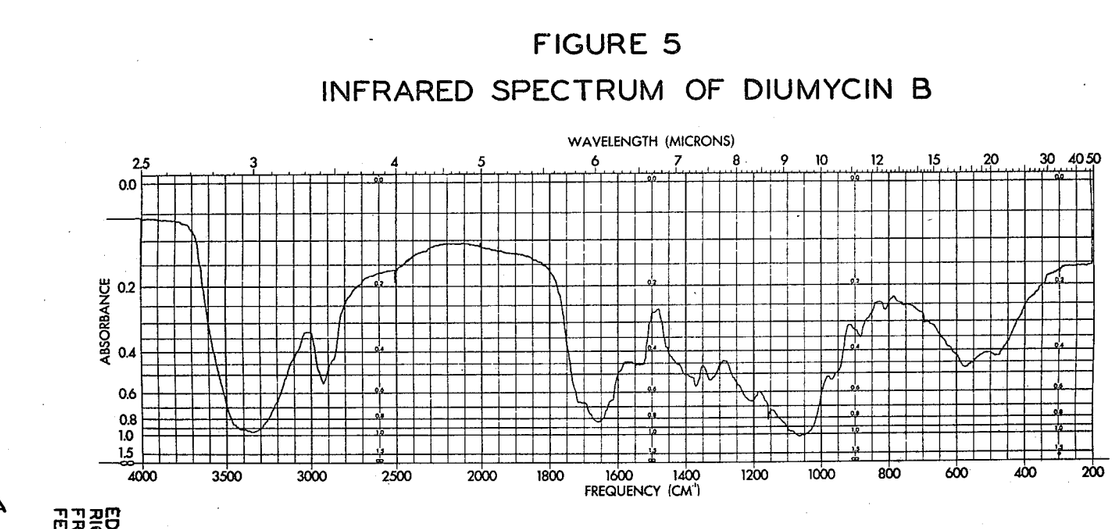
Figure 6:
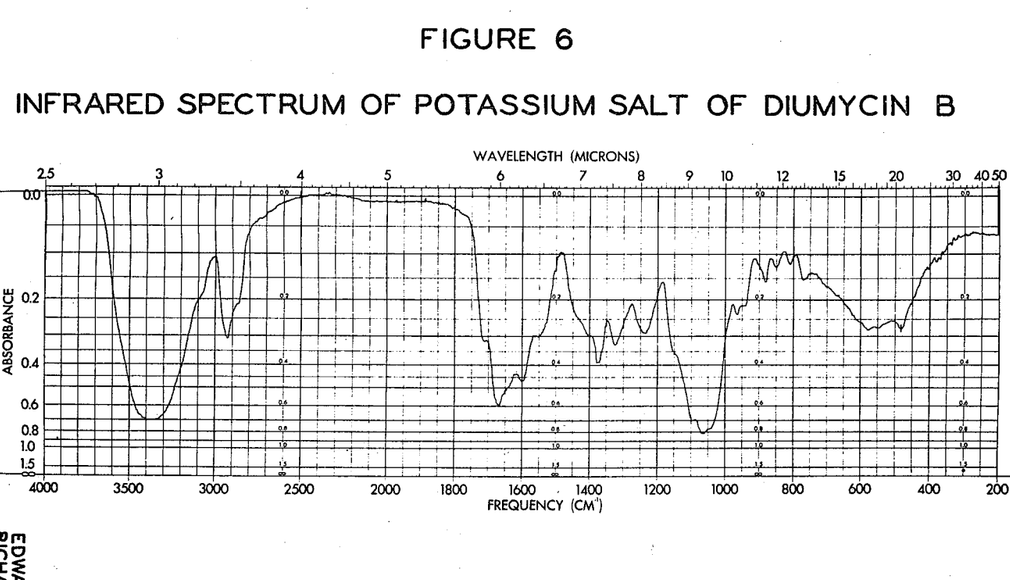

Diumycin B has the following physical and chemical properties:

Color: Colorless (white).
Melting point: About 170° C. with decomposition.
Elementary (free acid-hydrate) (approximate): C, 45.9%; H, 6.6%; N, 4.6%; P, 1.8%; O, 41.1% (by difference).
$H_2O$ hydration=7.6%.
Molecular weight: (An analytic ultrasonic centrifuge) 1850±10% in the same solvent as described for diumycin A.
Solubility: Same as diumycin A.
Ultraviolet spectrum: Diumycin B has no ultraviolet absorption maximum between 220 and 300 m$\mu$.
Infrared spectrum: The infrared spectrum of diumycin B as a free acid in KBr pellet is reproduced in FIGURE 5 in the drawings and as the potassium salt is reproduced in FIGURE 6 in the drawings.

Distribution coefficient in n-propanol, n-butanol, 0.5 N-ammonia (2:3:4 by volume): 0.39.

The filter cake of the fermentation of Streptomyces umbrinus, as well as each of the antibiotics recovered therefrom (i.e., umbrinomycin, umbrinomycin A, umbrinomycin B, diumycin, diumycin A and diumycin B), possesses growth promoting properties when fed to animals, such as poultry (e.g., chickens and turkeys), pigs and other farm animals. For this purpose they are mixed with the feedstuff of the animal in a concentration in the range of about 0.5 to about 100 g. per ton of final feed.

The following examples illustrate the invention (all temperatures being in centigrade):

EXAMPLE 1

Tomato paste-oatmeal agar slants are seeded with Streptomyces umbrinus ATCC 15972. They are incubated for seven to ten days and then used to inoculate 125 ml. of aqueous soybean meal medium contained in 500 ml. Erlenmeyer flasks. The composition of the germination medium is:

| | |
|---|---|
| Soybean meal (Stanley's nutrient) | g.. 15 |
| Dehydrated mashed potato | g.. 15 |
| Glucose | g.. 50 |
| $CoCl_2.2H_2O$ (0.05% solution) | ml.. 10 |
| $CaCO_3$ | g.. 10 |
| Agar | g.. 2.5 |
| Distilled water | liter.. 1 |

The medium is sterilized for twenty minutes at 121° and at fifteen pounds steam pressure. The germination flasks are incubated at 25° for 72 to 96 hours on a rotary shaker.

A 5% transfer is made from the germination flask to 500 ml. Erylenmeyer flasks containing 135 ml. of the same germination medium used above, except that the agar is omitted. The fermentation flasks are incubated and agitated in the same manner as the germination flasks. Samples are taken at three, five and seven days. They are examined by adjusting the pH to 3 with 0.2 N hydrochloric acid, centrifuging off with mycelium and extracting the mycelium with a volume of methanol equal to that of the supernatant. The methanolic extract is examined by paper chromatography. Suitable amounts of the extract are spotted on sheets of Whatman 4 paper and the chromatograms developed with a solvent system of the following composition: n-butanol, water, acetic acid; 4:5:1 (v./v./v.). The upper phase of this solvent system is utilized as the solvent. In this system the crude antibiotic material umbrinomycin has an RF value of approximately 0.9, whereas diumycin has an RF value of approximately 0.3. The antibiotic material is detected by bioautography against Staphylococcus aureus 209P.

EXAMPLE 2

A 4.5 liter batch of Streptomyces umbrinus ATCC 15972 is fermented as follows:

(A) Inoculum preparation

Inoculum source: Culture of Streptomyces umbrinus ATCC 15972 preserved by lyophilization in milk.

Medium:

| | |
|---|---|
| Soybean meal | g.. 15 |
| Dehydrated mashed potato | g.. 15 |
| Glucose | g.. 50 |
| $CoCl_2.2H_2O$ (0.05% solution) | ml.. 10 |
| $CaCO_3$ | g.. 10 |
| Agar | g.. 2.5 |
| Distilled water | liter.. 1 |

Two flasks containing 125 ml. of the medium per 500 ml. flask are incuated ninety-six hours at 25° on the rotary shaker. 250 ml. from the above cultures are added to 4.5 liters of the above medium, except that the agar is omitted, in a 7 liter stirred jar and is incubated for 168 hours in a 25° water bath after the addition of about 0.005% of batch of a defoamer. During incubation, the broth is aerated at the rate of two liters air per minute and agitated at 500 r.p.m. The resultant material is acidified to pH 3.0 with hydrochloric acid and filtered to obtain the mycelial cake.

EXAMPLE 3

A 30 liter batch of *Streptomyces umbrinus* is fermented in a 38 liter stainless steel vessel with the media and operating conditions described below:

Stage 1

Inoculum: Culture of *S. umbrinus* ATCC 15972 preserved by lyophilization in milk and grown out on a tomato paste-oatmeal agar slant.

| Medium: | Percent |
| --- | --- |
| Soybean meal (Staley's 4S) | 1.5 |
| Dehydrated mashed potato | 1.5 |
| Glucose | 5.0 |
| $CoCl_2 \cdot 2H_2O$ | 0.0005 |
| $CaCO_3$ | 1.0 |
| Agar | .25 |

125 ml. of this medium in a 500 ml. flask is incubated 96 hours on a rotary shaker at 25° C.

Stage 2

Inoculum source: 125 ml. from first stage.
Medium: Same as stage 1. 1000 ml. of medium and inoculum in a 4000 ml. flask is incubated 48 hours at 25° C. on the rotary shaker.

Stage 3

Inoculum source: 100 ml. from stage 2.

| Medium: | Percent |
| --- | --- |
| Soybean meal (Staley's 4S) | 1.5 |
| Hi-Starch No. 2 | 1.5 |
| Glucose | 5.5 |
| $CoCl_2 \cdot 2H_2O$ | 0.0005 |
| $CaCO_3$ | 1.0 |
| Ucon LB625 | 0.05 |

30 liters of the medium containing the inoculum is incubated for 168 hours. During incubation, the broth is aerated at the rate of 1 foot/minute superficial air velocity and agitated for the first 12 hours and 4 feet/minutes superficial air velocity and agitated thereafter.

EXAMPLE 4

The damp mycelial cake obtained in Example 2 (containing about 4% filter aid) is extracted with methanol twice, with two parts (w./v.) of methanol. The cake is filtered between extractions. The combined filtrate is adjusted to pH 6 to 8 and is concentrated in vacuo to remove the methanol, leaving an aqueous suspension.

The aqueous suspension, obtained by concentration of the methanolic extract, is adjusted to pH 7.0 and extracted three times with chloroform, using 0.3 volume of chloroform each time. The pH is determined after each extraction, and if necessary, is readjusted to pH 7.0. The pooled chloroform extracts are dried with anhydrous sodium sulfate and concentrated in vacuo to a heavy syrup.

Eight to ten volumes of acetone are added to the heavy syrup and the mixture shaken for one hour and filtered. The supernatant is then concentrated in vacuo to a small volume and the concentrate is diluted with ten volumes of n-hexane, yielding a precipitate of crude umbrinomycin.

Further purification of the crude umbrinomycin is effected by thin layer chromatography of the hexane insoluble precipitate on silica gel H. The solvent system is composed of 10% $CHCl_3$ in ethyl acetate. The salmon colored band is eluted from the silica gel with ethyl acetate. The eluate is concentrated in vacuo, dried with $Na_2SO_4$, and rechromatographed on silica gel H with the same solvent system. The salmon colored band is eluted and the eluate concentrated to dryness, yielding 118 mg. of material.

EXAMPLE 5

One hundred eighteen mg. material, obtained as described in Example 4 is loaded onto 20 g. acid-washed alumina contained in a glass column. The column is washed with hexane to remove inactive material, and the material eluted with ethyl acetate, methanol, acetic acid (94, 5, 1, v./v./v.). The dark red band is collected and concentrated to dryness, yielding 70 mg. of purified umbrinomycin antibiotic material.

EXAMPLE 6

The material (25 mg.) prepared in Example 6 is chromatographed again by thin layer chromatography on Merck's acid-washed alumina using 50% chloroform ethyl acetate and the eluate concentrated to give 21 mg. of maroon powder. Recrystallization from benzene yields about 14.4 mg. of purified umbrinomycin material, melting point 105–110°;

$\lambda_{max.}^{EtOH}$ 302 m$\mu$ ($\epsilon$, 20,200), 472 m$\mu$ ($\epsilon$, 5600)

*Analysis.*—Calc'd for $C_{22}H_{24}O_8$ (416.4): C, 63.45; H, 5.81. Found: C, 63.22; H, 5.98.

The purified material obtained in accordance with Example 6 is found to be a mixture of the antibiotics, umbrinomycin A and umbrinomycin B.

EXAMPLE 7

Isolation of umbrinomycin A and umbrinomycin B

The antibiotic mixture, prepared in Example 6 is resolved into two isomeric antibiotics, umbrinomycin A and umbrinomycin B, by column chromatography on acid-washed alumina (Activity IV) using the gradient elution technique with the solvents: benzene, chloroform and ethyl acetate. Umbrinomycin A is eluted first from the column and recrystallized from benzene, melting point 113–117°. After further purification by thin layer chromatography on acid-washed alumina using 1:1 chloroform-ethyl acetate as the developing solvent followed by recrystallization from benzene, pure umbrinomycin A is obtained as deep red crystals.

Umbrinomycin B is eluted secondly from the column. Fractional crystallization from benzene gives deep maroon crystals of pure umbrinomycin B.

EXAMPLE 8

Acylation of umbrinomycin B

Umbrinomycin B (27 mgs.) is dissolved in 1 ml. of pyridine and 0.5 ml. of acetic anhydride and the mixture is allowed to stand overnight. The resulting solution is concentrated, and the residue washed with 10% sodium bicarbonate and extracted into chloroform. The chloroform extract is concentrated and the product purified by thin layer chromatography on Activity 4 neutral alumina using chloroform as the developing solvent. The appropriate orange band is eluted with ethyl acetate and the product crystallized from methanol to yield orange crystals of triacetyl umbrinomycin B, melting point 125–126;

$\lambda_{max.}^{EtOH}$ 253 m$\mu$ ($\epsilon$, 10,800), 302 m$\mu$ (22,400); 458 m$\mu$ ($\epsilon$, 4100)

Similarly, following the procedure of Example 8, but substituting equivalent amounts of various acylating agents, for example, propionic anhydride or benzoyl chloride for acetic anhydride the respective acyl derivatives of umbrinomycin B are obtained.

EXAMPLE 9

Acylation of umbrinomycin A

Following the acetylation procedure described in Example 8, umbrinomycin A gives an orange triacetyl derivative, melting point 169.5–170.5°;

$\lambda_{max.}^{EtOH}$ 254 m$\mu$ ($\epsilon$, 11,000), 302 m$\mu$ ($\epsilon$, 21,200), 454 m$\mu$ ($\epsilon$, 3800)

EXAMPLE 10

The pH of the pooled fermentation broths obtained from 3–30 liter fermentations as described in Example 3 is adjusted to pH 3 with concentrated hydrochloric acid. Filter aid (Hyflo 1.5 kg.) is added and the insoluble material is removed by filtration to yield 11.0 kg. of mycelial cake.

EXAMPLE 11

The filter cake (11.0 kg.) obtained in Example 10 is extracted twice with 30 l. portions of methanol for one-half hour. The cake is filtered between extractions. The combined methanol extracts are adjusted to pH 6, and are concentrated in vacuo to 2.5 l. to remove the methanol. The resulting aqueous suspension is adjusted to pH 8 and extracted four times with 500 ml. portions of butanol to remove the umbrinomycin antibiotic leaving the diumycin antibiotic in the aqueous phase. The aqueous phase is then adjusted to pH 3 with 2 N HCl and extracted 3 times with 1 l. portions of butanol. The pooled butanol extracts (3 l.) are extracted 3 times with 200 ml. portions of water which is adjusted to pH 7 with 2.5 N NaOH during the extraction. The combined aqueous extracts are freeze-dried. The residue (22.9 g.) is dissolved in 250 ml. of methanol, the insoluble material filtered off, and the filtrate concentrated to yield 12.0 g. of crude antibiotic as a brownish red amorphous solid having a content of 5–10% diumycin.

EXAMPLE 12

2 grams of crude antibiotic obtained in Example 11 is dissolved in 10 milliliters of 0.1 N ammonium bicarbonate and charged onto a column (90 x 3.2 cm.) of Sephadex 75 equilibrated with the same buffer. The column is developed with 0.1 N ammonium bicarbonate solution and 100 fractions of 15 ml. each are collected and analyzed by measurement of ultraviolet absorption at 257 m$\mu$. The degree of absorption at 257 m$\mu$ is found to correspond approximately to the degree of biological activity. The majority of antibiotic is found in fractions 25–40. These fractions are freeze dried to yield 0.85 g. of product consisting of 15–20% of the antibiotic, diumycin.

EXAMPLE 13

The crude antibiotic obtained as described in Example 12 is further purified by chromatography on acid-washed silica gel (100–200 mesh). The crude antibiotic (.80 g.) dissolved in 20 ml. of propanol-2 N ammonia (8:2 by volume) is charged onto a column (33 x 2.5 cm.) of silica gel and the column developed and eluted with the same solvent mixture collecting fractions of 15 ml. each. The fractions are examined for ultraviolet absorption at 257 m$\mu$ and biological activity. The majority of the antibiotic is found in fractions 65–90. The combined biologically active fractions are concentrated to dryness in vacuo leaving 152 mgs. of light tan amorphous product having a content of the antibiotic diumycin of 80–85%.

EXAMPLE 14

The diumycin antibiotic may be further purified by partition column chromatography on crystalline cellulose (Avicel) using a propanol, butanol, 2 N ammonium hydroxide (1:3:4 by volume) system. The cellulose is impregnated with 50% of its weight of the lower phase of the above system and packed in a column (38 x 2.5 cm.) using the upper phase. The antibiotic (235 mg.) obtained as described in Example 13 is dissolved in 3 ml. of the lower phase of the propanol-butanol-2 N aqueous ammonia (1:3:4) system and the solution placed on the column. The upper phase of this system is then used for development and elution of the antibiotic. Ninety fractions of 15 ml. each are collected. The majority of the antibiotic is found in fractions 12–37. These fractions are combined, concentrated to dryness, the residue dissolved in methanol and precipitated by the addition of ether to yield 200 mg. of a colorless, amorphous, ammonium salt of pure diumycin.

EXAMPLE 15

The diumycin complex obtained in Example 14 consists of the major antibiotic, diumycin A and a minor component, diumycin B. Diumycin A may be separated from diumycin B by countercurrent distribution of the complex using the solvent system: n-propanol, n-butanol, 0.5 N ammonia (2:3:4 by volume). The ammonium salt complex (300 mg.) (from Example 14) is subjected to 500 transfers in a countercurrent distribution apparatus under an atmosphere of nitrogen gas using the system mentioned above. Tubes 65–90 (K=.19) are combined and concentrated in vacuo. The residue is taken up in methanol and precipitated with ether to yield 98 mg. of ammonium salt of diumycin A. Tubes 145–200 are worked up in a similar manner to obtain 10 mg. of the ammonium salt of diumycin B (K=.47).

The free acid of the major antibiotic, diumycin A, is obtained by dissolving the ammonium salt (50 mg.) in water and treating the solution with the ion exchange resin Dowex 50 (H$^+$ form). The resin is filtered off and the filtrate concentrated to dryness under vacuum. The residue is precipitated from methanol solution by the addition of ethyl acetate to yield 41 mg. of the colorless, amorphous free acid of diumycin A.

EXAMPLE 16

Diumycin A and B may be resolved by partition paper chromatography and detected by bioautography. 0.1 $\mu$g. of the material obtained in Example 14 is spotted on doubly acid-washed filter paper (e.g. Munktells No. S–302), 22 inches in length, and the filter paper sheet dipped through a solution of acetone and lower phase of the solvent system (2:1 by volume). The sheet is air dried at room temperature (2–3 minutes) to remove the acetone and is then developed with the upper phase of the solvent system consisting of n-propanol, n-butanol, 0.5 N ammonia (1:3:4 by volume) for 16 hours. The solvents are removed by air drying and the sheet bioautographed on agar seeded with *Staphylococcus aureus* 209P. Diumycin A is characterized by an RF value of .32 and diumycin B by RF .45.

EXAMPLE 17

Salts of diumycin A

The free acid of diumycin A is suspended in water (30 mg./ml.) and 1 N potassium hydroxide solution is added to pH 8 and the solution stirred to complete solution of the antibiotic. Eight volumes of acetone are added and the precipitate of potassium salt filtered off and dried under reduced pressure.

Similarly, following the procedure of Example 17, but substituting equivalent amounts of sodium hydroxide, barium hydroxide or organic bases such as dimethylamine, the respective salts of diumycin A are obtained. Similarly, by substituting diumycin B for the diumcyin A in the procedure of Example 17, the potassium salt of diumycin B is obtained.

Figure 1:
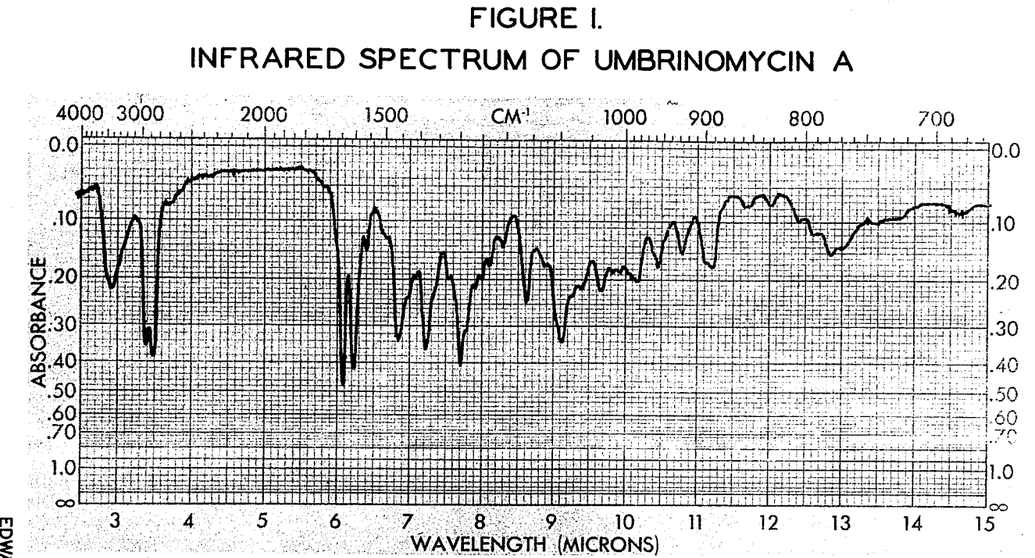
Figure 2:
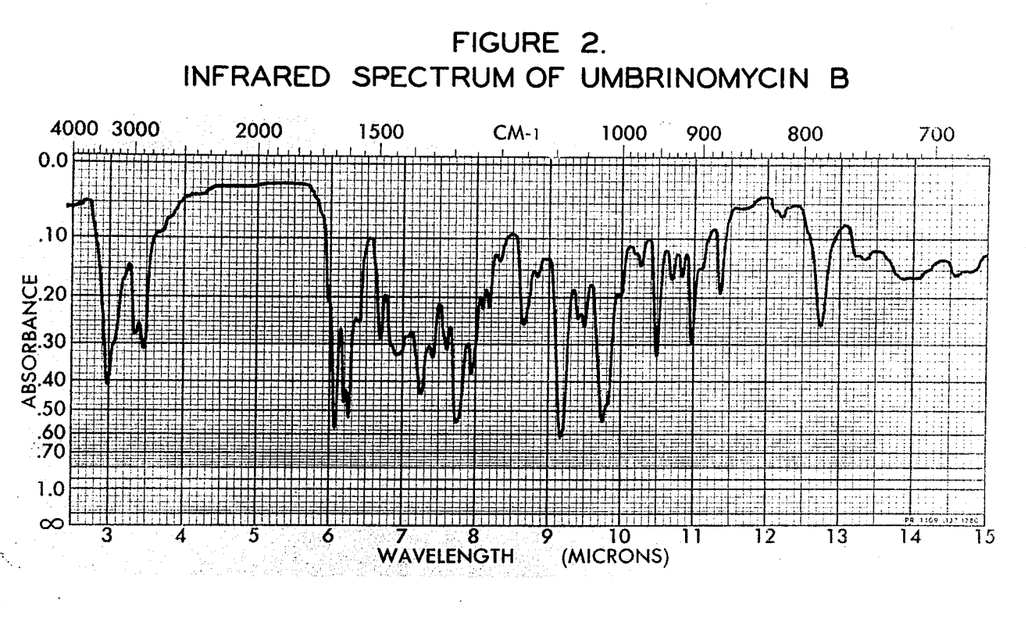
Figure 3:
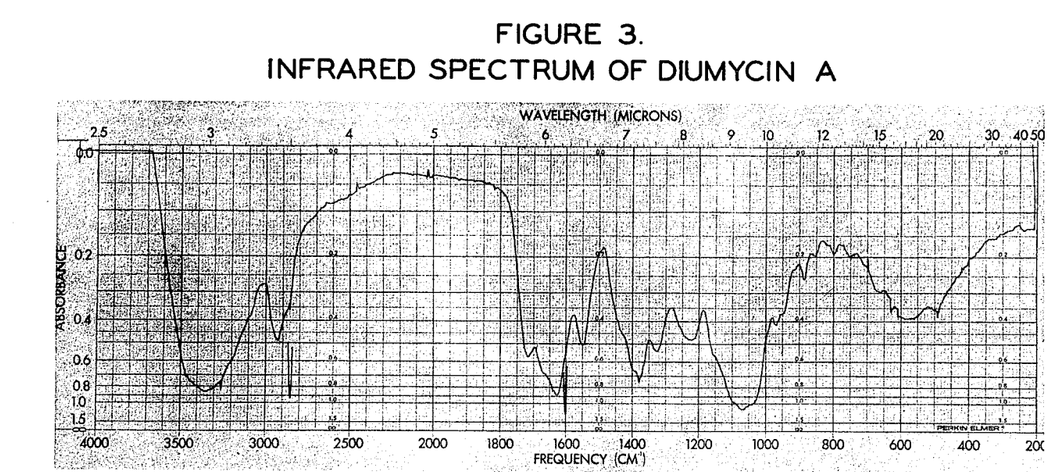
Figure 4:
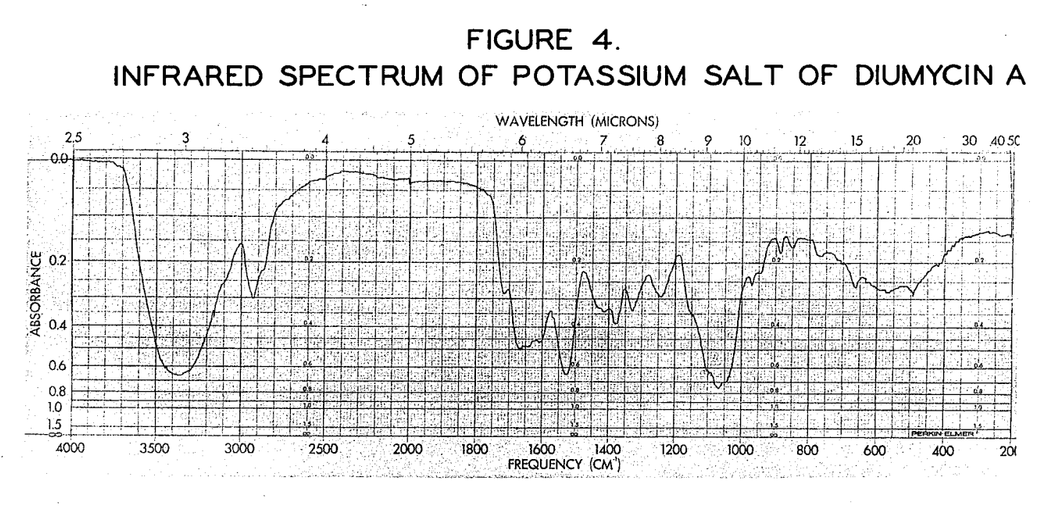

What is claimed is:

1. An antibiotic effective in inhibiting the growth of gram-positive bacteria selected from the group consisting of umbrinomycin A, umbrinomycin B, diumycin A, diumycin B and the physiologically acceptable salts thereof, said umbrinomycin A being an alcohol having a red color, soluble in ether, methanol and benzene and insoluble in hexane, an ultraviolet absorption spectrum showing maxima at 242.5, 304 and 476 m$\mu$, an infrared spectrum in Nujol mull as shown in FIGURE 1 and elementary analysis (approximate): C=63.78%; H=6.19%; and O=30.03% (by difference); said umbrinomycin B being an alcohol having a maroon color, soluble in ether, methanol and benzene and insoluble in hexane, an ultraviolet absorption spectrum showing maxima at 254, 304 and 476 m$\mu$, an infrared spectrum in Nujol mull as shown in FIGURE 2 and elementary analysis (approximate): C=63.53%; H=5.91%; and O=30.56% (by difference); said diumycin A being a phosphorus containing acid having a white color, soluble in water, lower alkanols, pyridine and acetic acid, sparingly soluble or insoluble in acetone, chloroform and benzene, an ultraviolet absorption spectrum showing a maximum at 257 m$\mu$, and an infrared spectrum as the free acid in KBr pellet as shown in FIGURE 3 and elementary analysis (approximate): C=46.5%; H=7.2%; N=4.5%; P=2.0% and O=39.8% (by difference); and said diumycin B being a phosphorus containing acid having a white color, soluble in water, lower alkanols, pyridine and acetic acid, sparingly soluble or insoluble in acetone, chloroform and benzene, an ultraviolet absorption spectrum showing no maximum between 220 and 300 m$\mu$, an infrared spectrum as the free acid in KBr pellet as shown in FIGURE 4 and elementary analysis (approximate): C=45.9%; H=6.6%; N=4.6%; P=1.8% and O=41.1% (by difference).

2. A product of claim 1 wherein the antibiotic is umbrinomycin A.

3. A product of claim 1 wherein the antibiotic is umbrinomycin B.

4. A product of claim 1 wherein the antibiotic is diumycin A.

5. A product of claim 1 wherein the antibiotic is diumycin B.

6. A process for preparing an antibiotic of claim 1, which comprises cultivating the microorganism *Streptomyces umbrinus* ATCC 15972 in an aqueous nutrient medium under aerobic conditions until antibiotic activity is imparted to said medium, separating from the fermentation broth the mycelium thereof, and extracting said antibiotic from the mycelium.

References Cited

UNITED STATES PATENTS 3,316,149    4/1967    Nishimura __________ 424—118

ALBERT T. MEYERS, Primary Examiner

J. D. GOLDBERG, Assistant Examiner

U.S. Cl. X.R.

424—122

GG113b

UNITED STATES PATENT OFFICE

CERTIFICATE OF CORRECTION

Patent No. 3,496,268  Dated February 17, 1970

Inventor(s) Felix E. Pansy, Edward Meyers, Richard Donovick, Frank L. Weisenborn It is certified that error appears in the above-identified patent and that said Letters Patent are hereby corrected as shown below:

Column 4, lines 9, 11 and 12 -- "acrylating" should read: acylating;

Column 5, line 43 -- "ultrasonic" should read: ultra;

line 65 -- insert: analysis after the word: Elementary;

Column 6, line 25 -- "Stanley's" should read: Staley's;

line 36 -- "Erylenmeyer" should read: Erlenmeyer;

line 73 -- "incuated" should read: incubated;

Column 8, line 17 -- "Example 6" should read: Example 5;

Column 11, line 29 -- change "in" to is.

Signed and sealed this 25th day of April 1972.

(SEAL)
Attest:

EDWARD M. FLETCHER, JR.
Attesting Officer

ROBERT GOTTSCHALK
Commissioner of Patents